Nov. 13, 1928.

C. R. GARRARD ET AL 1,691,389

VARIABLE SPEED GEAR

Filed March 8, 1928

2 Sheets-Sheet 1

INVENTORS
Charles Riley Garrard & Ernst Gottlieb Fauser

BY
Robert O. Phillips
ATTORNEY

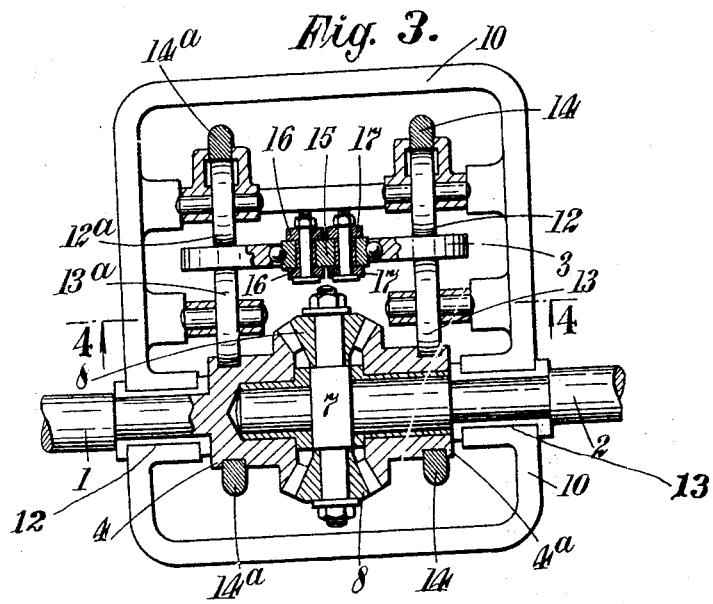
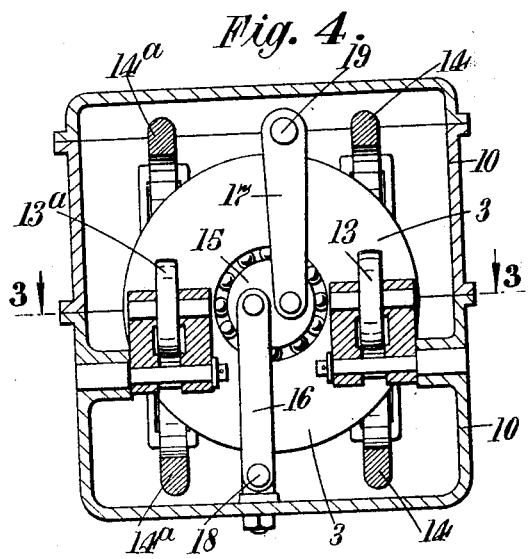

Patented Nov. 13, 1928.

1,691,389

UNITED STATES PATENT OFFICE.

CHARLES RILEY GARRARD AND ERNST GOTTLIEB FAUSER, OF SYDENHAM, ENGLAND.

VARIABLE-SPEED GEAR.

Application filed March 8, 1928, Serial No. 260,144, and in Great Britain March 25, 1927.

This invention relates to variable speed gearing and comprises the combination of a variable speed gearing of the type in which the motion of one shaft is imparted to the other shaft through the engagement with the face of a disc wheel carried by one shaft of a roller carried by the other shaft, of a second roller in frictional contact with the disc wheel, a couple between said two rollers, and an epicyclic train of gearing between the two rollers, and it has for its object to provide a reduction gear having a zero position while the gear is in full pressure contact, which is not dependent on large frictional areas for its efficiency.

Figure 1:
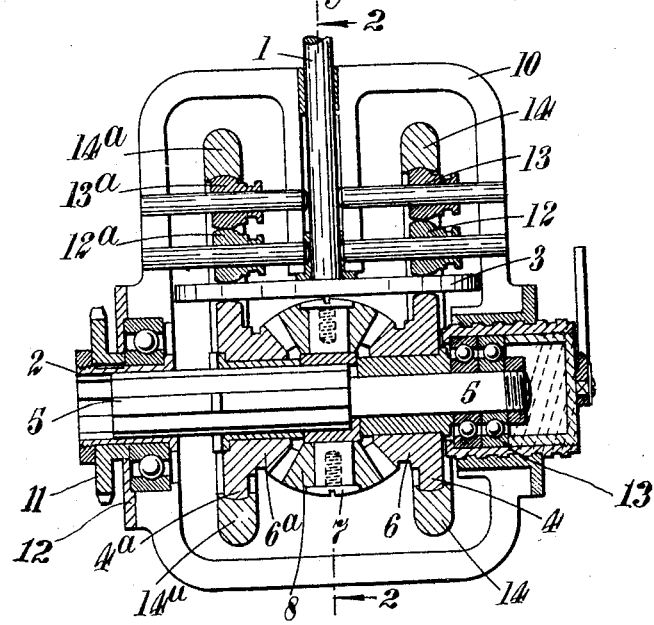
Figure 2:
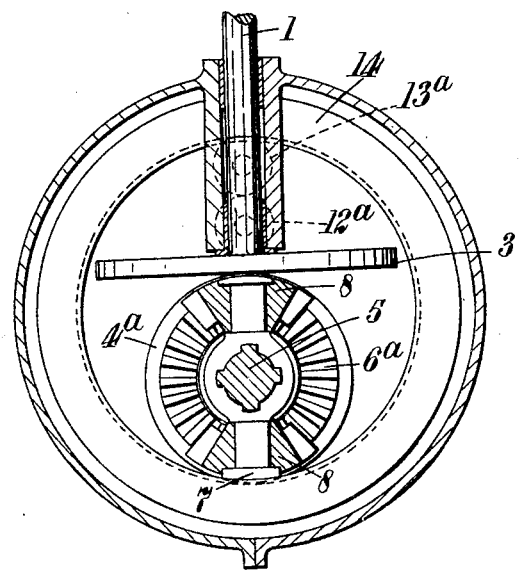

We attain this end by the construction shown in the accompanying drawings in which:—Figures 1 and 2 are views in sectional plan and sectional elevation showing a gear in which the driving and driven shafts are arranged at right angles to each other the latter figure being a section on line 2, 2, Figure 1, and Figures 3 and 4 are similar views showing a gear in which the driving and driven shafts are in axial alignment, the former figure being a section on line 3, 3 Figure 4, and the latter figure being a section on line 4, 4 Figure 3.

Throughout the views similar parts are marked with like numerals of reference.

In the construction shown in Figures 1 and 2 the driving shaft 1 is located at right angles to the driven shaft 2 the disc wheel 3 being mounted and fixed on the driving shaft 1. The driven shaft 2 which comprises a sleeve from which motion may be taken either direct or by a sprocket wheel 11 is mounted on a splined shaft 5 said sleeve and shaft running on bearings 12 and 13 carried by the box 10 of the gear. The primary rollers 4 and the secondary roller 4ª which contact with one face of the disc wheel 3 and are located on opposite sides of the centre of the disc wheel and are adapted to be moved across the face of the disc wheel together are formed in one with the sun wheels 6 and 6ª of an epicyclic train of gearing the planet wheels 8 of which are carried by the frame 7 of said train which is mounted to slide on the shaft 5. The sliding motion of the rollers 4 and 4ª and the epicyclic gear may be effected by any suitable mechanism such as that illustrated which comprises a coarse pitch screw 9 threaded into the case 10 of the gearing and carrying a thrust bearing 13 for the shaft 5, said screw being provided with an exterior lever 11ˣ by which it can be rotated. In the position shown in Figure 1 the gear is in its neutral position as any movement imparted by the disc wheel 3 to the roller 4 is balanced and counteracted by the movement of the roller 4ª in the reverse direction so that the planet wheels 8 simply revolve around their axes without imparting any rotating movement to the frame 7 and therefore to the driven shaft 2 through the shaft 5. Movement of the rollers and epicyclic gear to the left will cause the disc wheel to impart a greater speed of rotation to the roller 4ª than to the roller 4 whereby the planet wheels 8 will be caused to rotate about their axes and the frame 7 carrying them to rotate about the axis of the shaft 5, and thereby impart motion to the driven shaft 2 at a reduced speed.

To increase the frictional grip between the rollers and the disc wheel auxiliary rollers 12 and 12ª are employed to engage the other side of the disc wheel and binding rings 14 and 14ª being employed to engage the primary and secondary rollers 4 and 4ª and the auxiliary rollers 12 and 12ª the latter through intermediate rollers 13 and 13ª which are introduced solely for the purpose of preserving the direction of rotation of said engaging parts. Although the auxiliary and intermediate rollers and the binding rings will be constrained to follow the movements of the primary and secondary rollers said auxiliary rollers may be coupled to the primary and secondary and intermediate rollers by the usual forked couplings, the grooves for which in the auxiliary and intermediate rollers only are shown.

When the driving and driven shafts 1 and 2 are arranged in axial alignment as shown in Figures 3 and 4 the disc wheel is arranged to be moved transversely relative to the rollers 4 and 4ª, and the auxiliary rollers 12 and 12ª and the intermediate rollers 13 and 13ª, the roller 4 being mounted as a fixture on the driving shaft 1, and the latter 4ª loosely on the driven shaft 2 on which is fixed the frame 7 carrying the planet wheels 8 of the epicyclic train. This construction enables the relative movement between the disc wheel and the primary and secondary rollers to take place in both directions by which a reverse drive can be imparted to the driven shaft. The disc wheel 3 is arranged to float between the auxiliary rollers 12 and 12ª and the intermediate rollers 13 and 13ª the auxiliary rollers contacting the primary and secondary rollers 4 and 4ᵃ. The disc wheel is arranged to slide transversely in any convenient manner such as that illustrated in which it is mounted on a bearing 15 which is supported by two pairs of links 16 and 17 which are so arranged that the disc wheel is free to swing transversely in an approximately straight line, one pair of links 16 being pivoted at 18 to the case 10 of the gear and the other pair 17 being mounted on a shaft 19 which is capable of being rotated by means exterior to said case.

It will be obvious that further or other variations of the ratio of speed between the driving and driven shaft may be arrived at by varying the relative sizes of the two primary rollers or by varying the positions of the primary and secondary rollers relative to the disc wheel, and/or by varying the sizes of the primary wheels of the epicyclic gearing which are in couple with said rollers.

What we claim is:—

1. A variable speed gear comprising a driving shaft, a driven shaft, a disc wheel mounted on the driving shaft, two rollers mounted loosely on the driven shaft and in frictional contact with one face of said disc wheel one on each side of the axis of said wheel said rollers being free to traverse the face of the disc wheel, an epicyclic gear coupling said two rollers together the primary wheels of said gear being respectively in couple with one of said rollers and the element of said gear carrying the planet wheels being mounted on the driven shaft, two auxiliary rollers in frictional contact with the other face of the disc wheel, two intermediate rollers in frictional contact with the auxiliary rollers, a loose binding ring encircling the main rollers and the auxiliary rollers, and means for traversing the epicyclic gear and the main rollers transversely relative to the face of the disc wheel.

2. A variable speed gear comprising a driving shaft, a driven shaft, a disc wheel mounted on the driving shaft, two rollers mounted loosely on the driven shaft and in frictional contact with one face of said disc wheel one on each side of the centre of said wheel, said rollers being free to traverse the face of the disc wheel, an epicyclic gear coupling said two rollers together the primary wheels of said gear being respectively in couple with one of said rollers and the element of said gear carrying the planet wheels being mounted on the driven shaft, two auxiliary rollers in frictional contact with the other face of the disc wheel, two intermediate rollers in frictional contact with the auxiliary rollers, a loose binding ring encircling the main rollers and the auxiliary rollers, and means for traversing the epicyclic gear and the friction rollers transversely relative to the face of the disc wheel.

3. A gear consisting of a variable speed gearing of the friction disc and roller type, a couple between said gearing and the driving shaft, a secondary main roller in frictional contact with the disc wheel in axial alignment with the other roller and located on the other side of the centre of the disc wheel, auxiliary rollers coacting with the disc wheel, loose rings encircling each pair of main and auxiliary rollers, intermediate rollers between the auxiliary rollers and the loose rings, a coupling between said two rollers whereby they are constrained to move transversely across the face of the disc wheel together, an epicyclic train of gearing between the two main rollers the primary wheels of said train being coupled respectively to said two rollers and the frame of the train carrying the planet wheels of said train being coupled to the shaft to be driven, and means for traversing the two main rollers across the disc wheel.

4. A gear consisting of a variable speed gearing of the friction disc and roller type, a couple between said gearing and the driving shaft, a secondary main roller in frictional contact with the disc wheel in axial alignment with the other roller and located on the other side of the centre of the disc wheel, auxiliary rollers coacting with the disc wheel and located on the opposite side of said wheel to the main rollers, loose rings encircling each pair of main and auxiliary rollers, intermediate rollers between the auxiliary rollers and the loose rings, an epicyclic train of gearing between the two main rollers the primary wheels of said train being coupled respectively to the two rollers and the frame of the train carrying the planet wheels of said train being coupled to the shaft to be driven, and means for causing relative movement between the disc wheel and the main and auxiliary rollers.

5. In combination with a driving and a driven shaft of a variable speed gearing consisting of a disc wheel in couple with the driving shaft and a roller in frictional contact with and adapted to have transverse movement relative to said disc wheel between its centre and its periphery, a second roller in axial alignment with the first roller and in frictional contact with the disc wheel on the opposite side of its centre to the first roller and adapted to have transverse movement relative to the disc wheel in unison with the first roller and of an epicyclic train of gearing between said two rollers each primary wheel of said train being in couple with one of the two rollers of the variable speed gear and the frame carrying the planet wheels of the epicyclic train being mounted in couple with the driven shaft.

6. In combination, a driving and a driven shaft, a variable speed gearing comprising a disc wheel in couple with the driving shaft, a disc wheel and a roller in frictional contact with and adapted to have transverse movement relative to said disc wheel between its centre and its periphery, a second main roller in axial alignment with the first roller and in frictional contact with the disc wheel on the opposite side of its centre to the point of contact of the first roller and adapted to have transverse movement relative to the disc wheel in unison with the first roller, two auxiliary rollers adapted to contact the disc wheel on the opposite side to the main rollers and to move across the disc wheel in unison with said main rollers, a loose binding ring encircling and engaging each pair of main and auxiliary rollers, an intermediate roller between each auxiliary roller and its binding ring, and means for imparting relative movement to the disc wheel and the two main rollers, and an epicyclic train of gearing between said two rollers each primary wheel of said train being in couple with one of the two rollers of the variable speed gear and the frame carrying the planet wheels of the epicyclic train being mounted in couple with the driven shaft.

CHARLES RILEY GARRARD.
ERNST GOTTLIEB FAUSER.